United States Patent
Kim et al.

(10) Patent No.: US 9,457,855 B2
(45) Date of Patent: Oct. 4, 2016

(54) PANEL HANGER APPARATUS FOR ROLLER HEMMING

(75) Inventors: Ki Soon Kim, Ulsan (KR); Yun Heui Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 868 days.

(21) Appl. No.: 13/571,570

(22) Filed: Aug. 10, 2012

(65) Prior Publication Data
US 2013/0140419 A1   Jun. 6, 2013

(30) Foreign Application Priority Data
Dec. 1, 2011   (KR) ........................ 10-2011-0127960

(51) Int. Cl.
| B62D 65/02 | (2006.01) |
| B65G 47/91 | (2006.01) |
| B25B 11/00 | (2006.01) |
| B21D 39/02 | (2006.01) |
| B21D 43/00 | (2006.01) |
| B21D 43/18 | (2006.01) |
| B60R 11/00 | (2006.01) |

(52) U.S. Cl.
CPC ........... *B62D 65/022* (2013.01); *B21D 39/021* (2013.01); *B21D 39/023* (2013.01); *B21D 43/003* (2013.01); *B21D 43/18* (2013.01); *B25B 11/005* (2013.01); *B65G 47/91* (2013.01); *B60R 2011/0056* (2013.01)

(58) Field of Classification Search
CPC ..... B26D 7/018; B25B 11/005; B25B 11/00; H01L 21/6838; B23Q 3/088; B65G 47/91; B65G 49/061; B62D 65/022

USPC ....... 269/21; 29/721, 281.4; 414/627, 752.1; 248/309.3
See application file for complete search history.

(56) References Cited

U.S. PATENT DOCUMENTS

2010/0252973 A1* 10/2010 Reith et al. ..................... 269/37

FOREIGN PATENT DOCUMENTS

| CN | 1882401 A | 12/2006 |
| CN | 101288891 A | 10/2008 |
| CN | 101415521 A | 4/2009 |
| CN | 101559880 A | 10/2009 |
| CN | 101678431 A | 3/2010 |
| JP | 7132327 A | 5/1995 |
| JP | H10249454 A | 9/1998 |
| JP | 2002011525 A | 1/2002 |
| JP | 2010-240708 A | 10/2010 |
| KR | 10-0916779 | 9/2009 |
| KR | 10-0965098 | 6/2010 |
| KR | 10-2011-0028128 | 3/2011 |
| WO | 2011/135620 A1 | 11/2011 |

* cited by examiner

*Primary Examiner* — Joseph J Hail
*Assistant Examiner* — Jamal Daniel
(74) *Attorney, Agent, or Firm* — Mintz Levin Cohn Ferris Glovsky and Popeo, P.C.; Peter F. Corless

(57) ABSTRACT

A panel hanger apparatus for roller hemming is disclosed. The panel hanger apparatus clamps parts and loads the parts onto a hemming die, and comprises a hanger frame, a plurality of vacuum cups mounted to the hanger frame and adapted to hold the outer panel of the parts by using vacuum pressure, and a plurality of locators mounted to an edge of the hanger frame for clamping the inner panel of the parts.

5 Claims, 6 Drawing Sheets

PANEL HANGER APPARATUS FOR ROLLER HEMMING

CROSS-REFERENCE TO RELATED APPLICATION

This application claims priority to and the benefit of Korean Patent Application No. 10-2011-0127960 filed in the Korean Intellectual Property Office on Dec. 1, 2011, the entire contents of which are incorporated herein by reference.

BACKGROUND OF THE INVENTION (a) Field of the Invention

The present invention relates to a roller hemming system. More particularly, the present invention relates to a panel hanger apparatus for roller hemming which may clamp parts and load the parts to a hemming die.

(b) Description of the Related Art

Generally, after panels are manufactured through various press apparatus, the panels are then transmitted to a vehicle body factory at a first stage of a vehicle manufacturing process. The panels are assembled together so as to form a vehicle body of a body in white (B.I.W) shape.

After the panels of the vehicle body are formed to have a predetermined shape through various press apparatus by application of pressure, the panels are cut, drilled, bent, and/or curved through a variety of press processes such as trimming, piercing, flanging, hemming and so on.

In the roller hemming process, parts, which comprise an outer panel and an inner panel, are loaded on a hemming die by a robot hanger apparatus. The parts are then clamped by a clamper and are hemmed by a roller hemming apparatus.

However, in the conventional art, the robot hanger apparatus clamps the parts and the parts are loaded on the hemming die by a specific hanger. However, this results in a complex and relatively time consuming process because the clamping processes requires various steps such as positioning, fixing and etc. the parts on the hemming die.

Also, in the conventional art, as the parts move along the apparatus assembly line in the hemming process, the parts must be repeatedly clamped and un-clamped by the clamper. Thus, the entire system and roller hemming process is complex and time consuming. As a result, manufacturing costs of the parts is relatively high.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a panel hanger apparatus for roller hemming which is capable of clamping parts and loading the parts to a hemming die without requiring a specific hanger.

According to one aspect, a panel hanger apparatus for roller hemming is provided which clamps parts (as referred to herein, a "part" is understood as including an outer and an inner panel and, thus, the combination of an outer panel and an inner panel may be referred to simply as a "part") and loads the parts onto a hemming die, the panel hanger apparatus comprising a hanger frame, a plurality of vacuum cups mounted to the hanger frame and adapted to suction/hold the outer panel of the parts by using vacuum pressure, and a plurality of locators mounted at an edge of the hanger frame and which clamp the inner panel of the parts.

According to various embodiments, the panel hanger apparatus may further include at least one positioning pin which is mounted to the hanger, is insertable into a positioning hole formed in the inner panel, and which positions the parts.

According to various embodiments, the panel hanger apparatus may further include a locking unit which is mounted to the hanger frame and which is configured and arranged to fix the hanger frame to the hemming die.

According to various embodiments, the locking unit may include a locking arm which is mounted to the hanger frame and which is clamped by a pin clamper disposed on the hemming die.

According to various embodiments, a clamp hole may be formed in the locking arm where the pin clamper is connected thereto.

According to various embodiments, the hanger frame may be pressurized by a separate pressurizing unit while the apparatus is in a state of loading the parts on the hemming die.

According to various embodiments, the locator may be provided with a push block configured and arranged for pushing the inner panel while the apparatus is in a state of loading the parts on the hemming die.

According to various embodiments, the apparatus is configured and arranged for clamping a part which is a hood, and loading the hood on the hemming die.

According a further aspect, a panel hanger apparatus for roller hemming is provided for clamping parts and loading the parts to a hemming die, wherein the panel hanger apparatus according comprises a hanger frame, a plurality of vacuum cups mounted to the hanger frame and adapted to suction/hold the outer panel of the parts by using vacuum pressure, a plurality of locators mounted at an edge of the hanger frame and configured and arranged to clamp the inner panel of the parts, at least one positioning pin which is mounted to the hanger is insertable into a positioning hole formed to the inner panel and which is configured and arranged to position the parts, and a locking unit which is mounted to the hanger frame and which is configured and arranged to fixe the hanger frame to the hemming die.

According to various embodiments, the hanger frame may be pressurized by a separate pressurizing unit while the panel hanger apparatus is in a state of loading the parts on the hemming die. The locators may be provided with a push block configured and arranged for pushing the inner panel while the panel hanger apparatus is in a state of loading the parts on the hemming die. The locking unit may be clamped by a pin clamper disposed on the hemming die.

According to an exemplary embodiment of the present invention, the panel hanger apparatus may clamp, load, position and fix the parts on the hemming die as an all-in-one apparatus, and the apparatus may reduce the time required for the entire roller hemming process.

According to various embodiments, the apparatus may position the parts on the hemming die and fix the parts on the hemming die though the pressurizing unit and the push block while the apparatus is in a state of locking the hanger frame on the a base though the locking unit and the pin clamper.

As such, according to an exemplary embodiment of the present invention, the panel hanger apparatus may securely clamp the parts to the hemming die and may allow for the hemming process to be carried out without interference of a clamper which is used to clamp the parts in the conventional art.

Further, according to the present invention, repeat clamping and un-clamping of the parts by a clamper as the parts move along the apparatus assembly line in the hemming process is not required. As such, the time required for carrying out the entire roller hemming process may be reduced, the entire system may be simplified and manufacturing costs of the parts may be reduced.

Other aspects and exemplary embodiments of the invention are discussed infra.

BRIEF DESCRIPTION OF THE DRAWINGS

The drawings illustrate exemplary embodiments of the present invention and are not construed to limit any aspect of the invention.

DESCRIPTION OF SYMBOLS

Figure 1:
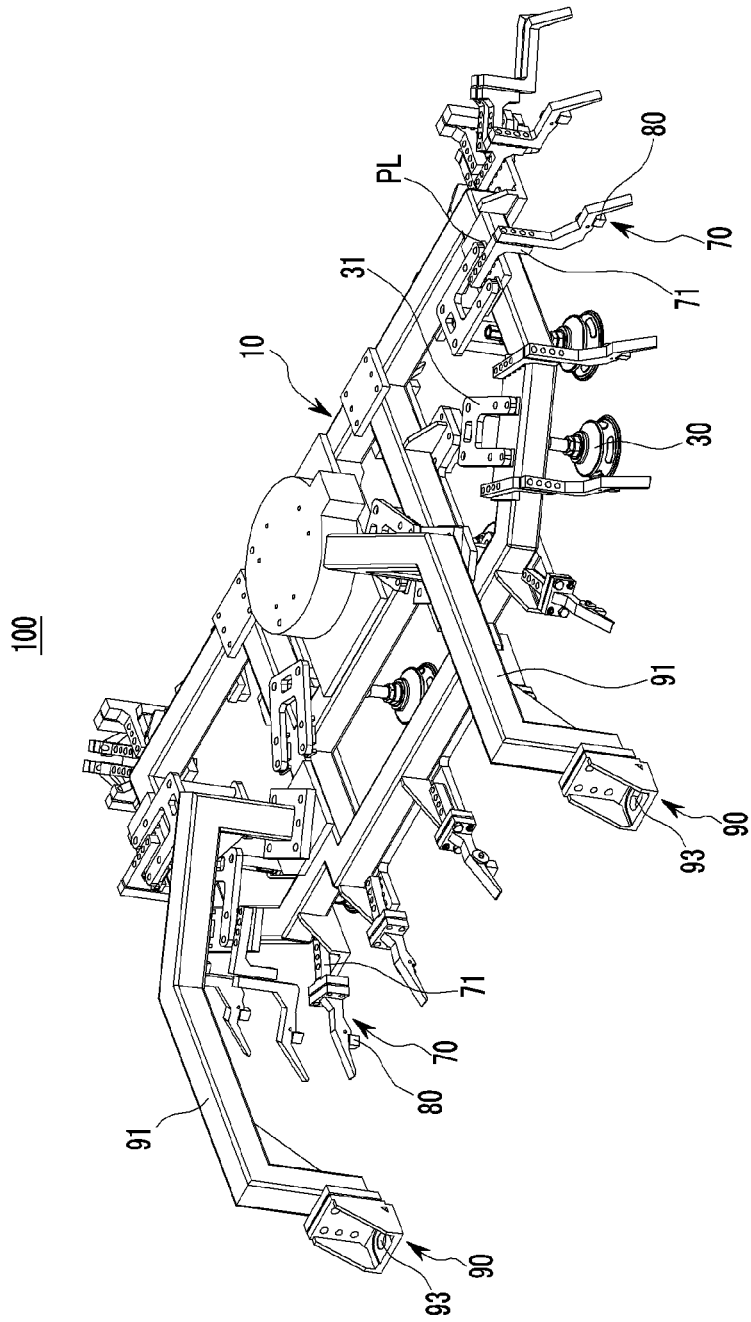
FIG. 1 and FIG. 2 are perspective views of a panel hanger apparatus for roller hemming according to an exemplary embodiment of the present invention.

| | | |
|---|---|---|
| 1: parts | 3: outer panel | |
| 5: inner panel | 6: base | |
| 7: hemming die | 8: pressurizing unit | |
| 9: pressurizing pad | 10: hanger frame | |
| 30: vacuum cup | 50: positioning pin | |
| 31: mounting bracket | 51: mounting block | |
| 60: pin clamper | 70: locator | |
| 61: clamping pin | 71: mounting block | |
| 80: push block | 90: locking unit | |
| 91: locking arm | 93: clamp hole | 100: hanger apparatus |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Description of components that are not necessary for explaining the present invention will be omitted, and the same constituent elements are denoted by the same reference numerals in this specification.

In addition, size and thickness of components shown in the drawings may be differ from real size and real thickness of the components for better comprehension and ease of description. Therefore, the present invention is not limited to those shown in the drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 2:
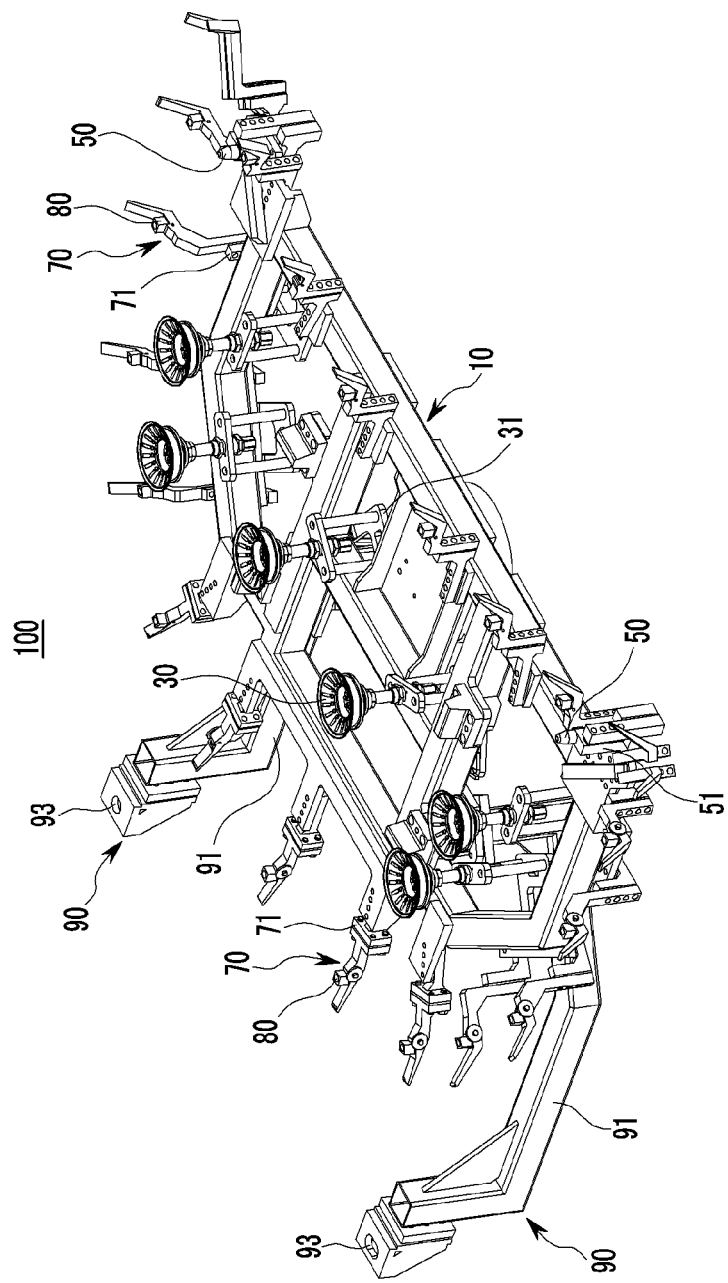
Figure 3:
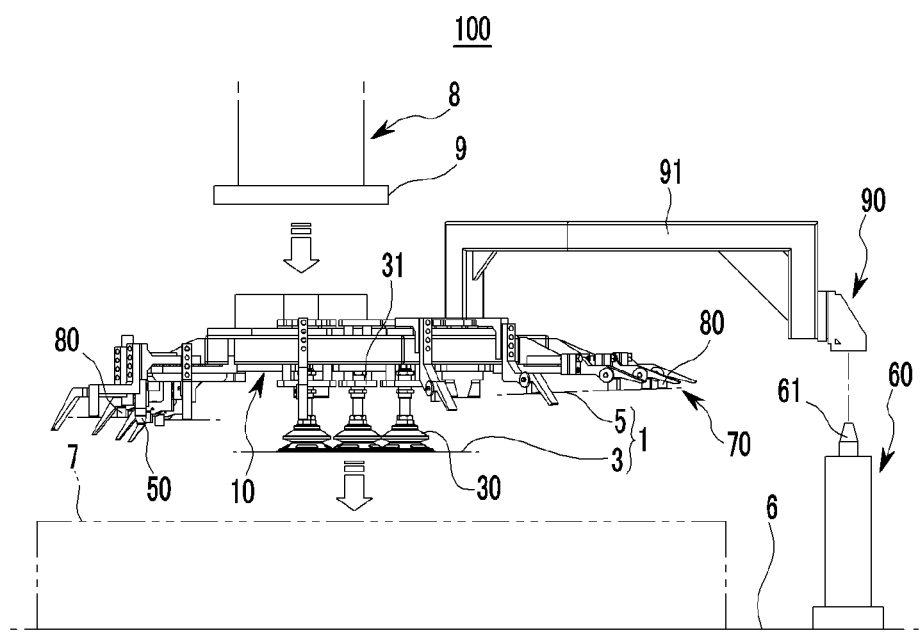
FIG. 3 is a side view of the panel hanger apparatus for roller hemming as shown in FIGS. 1 and 2.

FIG. 1 and FIG. 2 are perspective views of a panel hanger apparatus 100 for roller hemming according to an exemplary embodiment of the present invention, and FIG. 3 is a side view of the panel hanger apparatus 100 shown in FIGS. 1 and 2.

Referring to FIG. 1 to FIG. 3, the hanger apparatus 100 according to an exemplary embodiment of the present invention may be utilized in a panel forming process in which panels (hereinafter, outer and inner panels assembled together will be referred to as "parts" for convenience), such as a tail gate, a hood, etc., are formed.

According to the following exemplary embodiment, the part 1 will hereinafter be described as a hood including an outer panel 3 and an inner panel 5. However, the following description can similarly be applied to any other vehicle parts and, thus, the description is not limited to application only to hoods.

As shown in the exemplary embodiment of the present invention, the hanger apparatus 100 may be applied to a roller hemming system where an edge of the part 1 is bent and connected according to a roller hemming method.

In the roller hemming method, a flange of the outer panel 3 is bent toward an edge of the inner panel 5 by means of a hemming roller which moves along the edge of the outer panel 3 and the inner panel 5, thereby hemming the edge of the part 1.

The hanger apparatus 100 is adapted to clamp the part 1 which is loaded on a marriage jig (not shown) and load the part 1 on a hemming die 7 for the roller hemming process.

As shown in FIG. 3, the hemming die 7 may be disposed on a base 6.

The panel hanger apparatus 100 of the present invention is all-in-one apparatus. In particular, according to the exemplary embodiment of the present invention, the panel hanger 100 is configured and arranged to be capable of clamping the parts 1, loading the parts 1 onto the hemming die 7, and fixing the parts 1 on the hemming die 7. The present hanger apparatus 100 is capable of all of these features without requiring a specific hanger for loading parts to the hemming die 7 and, thus, is referred to as an "all-in-one" apparatus.

The panel hanger apparatus 100 according to an exemplary embodiment of the present invention as sown in FIGS. 1-3 basically includes a hanger frame 10, vacuum cups 30, a positioning pin 50, locators 70 and a locking unit 90, and these constituent elements will be discussed hereinafter.

In the exemplary embodiment of the present invention, the hanger frame 10 is mounted to an end of a handling robot (not shown) through a tool changer (not shown). Such handling robots and tool changers are well known and, thus, will not be described in detail herein.

The hanger frame 10 is a base frame that supports constituent elements and includes, for example, one or more brackets, supporting blocks etc. Thus, in the present exemplary embodiment, these constituent elements will be collectively referred to as the hanger frame 10.

In the depicted exemplary embodiment of the present invention, the vacuum cups 30 are adapted to fix the outer panel 3 of the parts 1 to the hanger frame 10 by applying suction to the parts 1 by using vacuum pressure.

Figure 4:
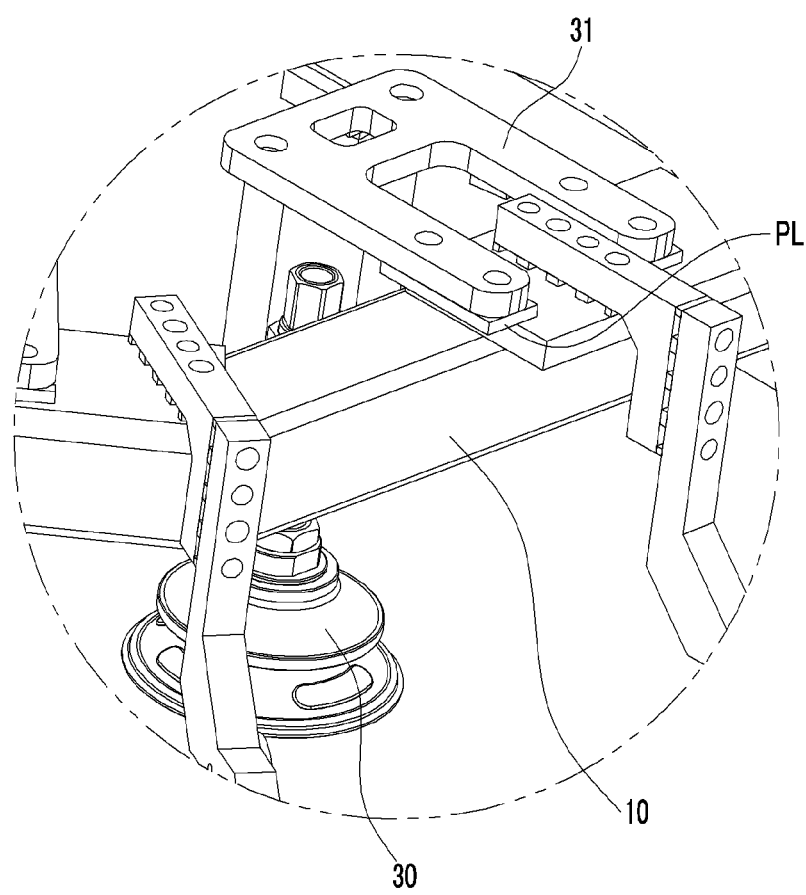
FIG. 4 is a drawing showing a vacuum cup of a panel hanger apparatus for roller hemming according to an exemplary embodiment of the present invention.

The vacuum cup 30, as shown in FIG. 4, is mounted to hanger frame 10 though a mounting bracket 31 corresponding to the outer panel 3 of the parts 1. Of course, any other mounting mechanism could also suitably be used.

In this case, the vacuum cup 30 is connected so as to be movable up and down though a spring (not shown) (or other suitable mechanism that provides the vacuum cup 30 with up and down motion). As such, a position of the vacuum cup 30 may be adjusted against the hanger frame 10 and the outer panel 3 by a suitable adjustment mechanism, such as a position adjust plate PL which is shown interposed between the mounting bracket 31 and the hanger frame 10.

Figure 5:
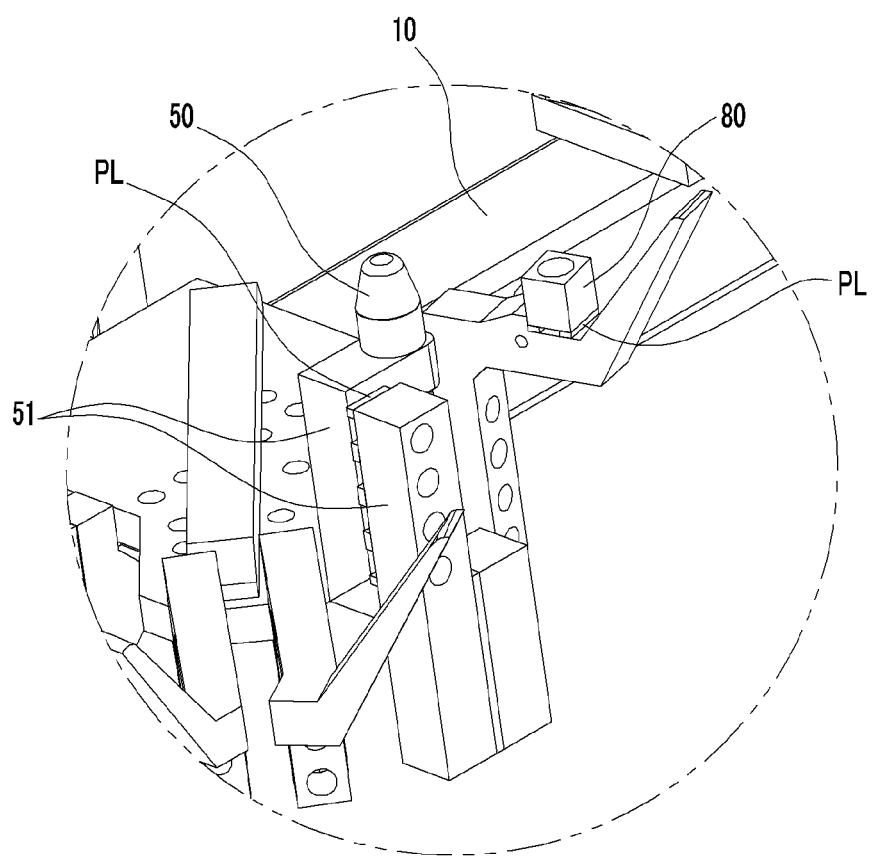
FIG. 5 is a drawing showing a positioning pin of a panel hanger apparatus for roller hemming according to an exemplary embodiment of the present invention.

Referring to FIG. 5, in the exemplary embodiment of the present invention, the positioning pin 50 is adapted to position the parts 1 to the hanger frame 10 correctly (positioning at a predetermined position). For example, as shown in FIG. 5, a pair of positioning pins 50 may be mounted to the hanger frame 10 corresponding to positioning holes (not shown) formed in the inner panel 5 of the parts 1.

The positioning pin 50 is insertable in the positioning hole formed to the inner panel 5 and, thus, the part 1 is correctly positioned on the hanger frame 10 (positioning at a predetermined position).

The positioning pin 50, as shown in FIG. 5, can be mounted to the hanger frame 10 though a mounting block 51, and a position of the positioning pin 50 may be adjusted, for example by a position adjust plate PL, against the hanger frame 10 and the inner panel 5.

Figure 6:
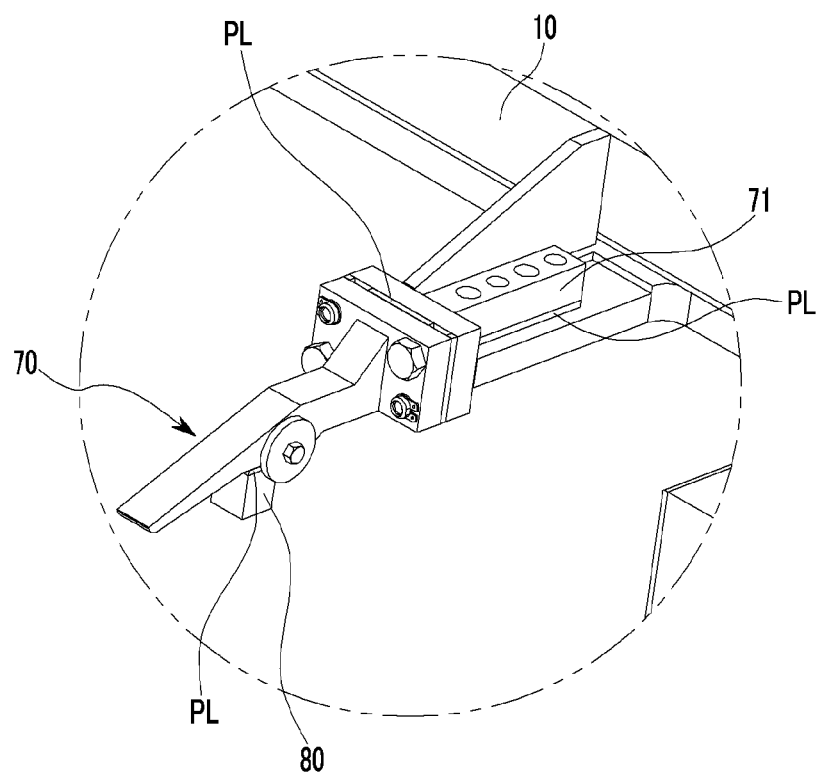
FIG. 6 is a drawing showing a locator of a panel hanger apparatus for roller hemming according to an exemplary embodiment of the present invention.

In the exemplary embodiment of the present invention, the locator 70 is adapted to clamp the inner panel 5 of the parts 1, and a plurality of locators 70, as shown in FIG. 6, are mounted at an edge of the hanger frame 10 though a mounting block 71.

A position of the locator 70 may be adjusted, such as by a position adjust plate PL, against the hanger frame 10 and the inner panel 5.

Meanwhile, the hanger frame 10 clamps the parts 1 by means of the vacuum cups 30 and the locator 70. The hanger frame 10 may be pressurized by a separated pressurizing unit 8, as shown in FIG. 3, when the hanger frame 10 is in a state of loading the parts 1 on the hemming die 7 with the parts 1 being toward the hemming die 7.

The pressurizing unit 8 includes a pressurizing pad 9 which may be movable up and down above the hemming die 7, such as by an operation cylinder (not shown), so as to pressurize the hanger frame 10.

As shown in the exemplary embodiment of the present invention, a push block 80 may be mounted on the locator 70 and may be configured and arranged for pushing the inner panel 5 of the parts 1.

The push block 80 pushes the inner panel 5 of the parts 1 while the parts 1 are loaded on the hemming die 7 by means of the hanger frame 10. Further, the hanger frame 10 may be pushed toward the hemming die 8 by means of the pressurizing unit 8.

In this case, a position of the push block 80 may be adjusted, such as by a position adjust plate PL, against the hanger frame 10 and the locator 70.

As shown in the exemplary embodiment of the present invention, the locking unit 90 is adapted to fix (lock) the hanger frame 10, which clamps the parts 1 by the vacuum cups 30 and the locator 70 and loads the parts 1 on the hemming die 7, such that the parts are suitably loaded on the hemming die 7.

As shown in FIG. 1 to FIG. 3, the locking unit 90 is mounted to the hanger frame 10, and is clamped by a pin clamper 60 mounted to the hemming die 7. As shown, the locking unit 90 further includes a locking arm 91 clamped to the pin clamper 60.

As shown in FIG. 2, the hanger frame 10 is connected to the locking arm 91 and a clamp hole 93 where a clamping pin 61 of the pin clamper 60 may be connected is formed in the locking arm 91.

As shown in FIG. 3, the pin clamper 60 is disposed on the base 6, and the clamping pin 61 may be moved up and down by means of a clamping cylinder or the like (not shown) within the pin clamper 60. The clamping pin 61 is insertable in the clamp hole 93 of the locking arm 91 so as to fix the locking arm 91 to the base 6.

The pin clamper 60 can be in accordance with any known pin clampers which are known to a person skilled in the art, and thus detailed description thereof will be omitted in the specification.

Hereinafter, operations of the panel hanger apparatus 100 according to an exemplary embodiment of the present invention will be described referring to the drawings.

In the exemplary embodiment of the present invention, the part 1 which comprises the outer panel 3 and the inner panel 5, is loaded on the marriage jig (not shown).

The hanger frame 10 of the hanger apparatus 100 is mounted to an end of a handling robot (not shown) through a tool changer (not shown).

The hanger apparatus 100 is then moved toward the marriage jig by the handling robot, and the part 1 is fixed to the hanger frame 100. In this case, the vacuum cups 30 can apply suction to and hold the parts 1 to the hanger frame 10 by using vacuum pressure.

In this case, the positioning pin 50 is inserted into the positioning hole of the inner panel 5 so as to properly position the parts 1 on the hanger frame 10, and the locators 70 clamp the edge of the inner panel 5 so as to fix the parts 1 to the hanger frame 10.

Then the handling robot moves the hanger frame 10, on which the part 1 is fixed by the vacuum cups 30 and the locators 70, to the hemming die 7, and loads the hanger frame 10 with the part 1 on the hemming die 7.

Then hanger frame 10 is locked on the base 6 near the hemming die 7 through the locking arm 91 of the locking unit 90.

The clamping pin 61 of the pin clamper 60 is then moved upward (e.g. by means of the clamping cylinder) and is inserted into the clamp hole 93 of the locking arm 9 so as to fix the hanger frame 10 to the base 6.

Thus, the part 1, which is clamped by the hanger frame 10, is properly positioned at the hemming die 7 by locking of the hanger frame 10 to the base 6 by means of the locking unit 90 and the pin clamper 60.

The handling robot then separates the hanger frame 10 from the end of the arm, and the pressurizing unit 8 moves the pressurizing pad 9 downward to pressurize the hanger frame 10.

The push block 80 mounted to the locator 70 pushes the inner panel 5 of the parts 1 while the hanger frame 10 is pushed toward the hemming die 7 by means of the pressurizing unit 8.

As such, the part 1 positioned on the hemming die 7 is fixed to the hemming die 7 through the pressurizing unit 8 and the push block 80.

Then a roller hemming apparatus (not shown) performs the hemming process, particularly by bending a flange of the outer panel 3 toward the edge of the inner panel 5 by means of a hemming roller so that the edge of the parts 1 is hemmed.

According to an exemplary embodiment of the present invention, the panel hanger apparatus 100 may clamp, load, position and fix the parts 1 on the hemming die 7 as an all-in-one apparatus, and the apparatus 100 may reduce the time required for the entire roller hemming process.

Also, the apparatus 100 according to an exemplary embodiment of the present invention may position the parts 1 on the hemming die 7 and fix the parts 1 on the hemming die 7 though the pressuring unit 8 and the push block 80 while the hanger frame 10 is locked on the base 6 though the locking unit 90 and the pin clamper 60. As such, according to an exemplary embodiment of the present invention, the apparatus 100 may secure clamping force of the parts 1 to the hemming die 7 and may carry out the hemming process without requiring the use of a clamper and, thus, without interference of a clamper which is used to clamp the parts 1 in the conventional art.

Also, the parts do not require repeated clamping and un-clamping by a clamper along the apparatus assembly line in the hemming process. Thus, the time required to carry out the entire roller hemming process may be reduced, the entire system may be simplified and manufacturing costs of the parts may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A panel hanger apparatus comprising:
   a plurality of parts each including an outer and an inner panel, the parts configured to be loaded onto a hemming die;
   a hanger frame;
   a plurality of vacuum cups mounted to the hanger frame and adapted to hold the outer panel of the parts by vacuum pressure;
   a plurality of locators mounted at an edge of the hanger frame and configured and arranged for clamping the inner panel of the parts, wherein each of the locators is provided with a push block configured and arranged for pushing the inner panel while the hanger apparatus loads the parts on the hemming die; and
   a pressurizing unit separate from the hanger frame, the pressurizing unit configured to pressurize the hanger frame while the panel hanger apparatus loads the parts on the hemming die,
   wherein each of the parts is a hood, and the panel hanger apparatus loads the hood on the hemming die.

2. The panel hanger apparatus of claim 1, wherein the panel hanger apparatus further comprises at least one positioning pin which is mounted to the hanger, the at least one positioning pin being insertable in one or more positioning holes in the inner panel, and being configured and arranged to position the parts.

3. The panel hanger apparatus of claim 1, wherein the panel hanger apparatus further comprises a locking unit which is mounted to the hanger frame and which is configured and arranged to fix the hanger frame to the hemming die.

4. The panel hanger apparatus of claim 3, wherein the locking unit comprises a locking arm which is mounted to the hanger frame and configured to be clamped by a pin clamper disposed on the hemming die.

5. The panel hanger apparatus of claim 4, wherein a clamp hole is formed in the locking arm where the pin clamper is disposed.

* * * * *